(No Model.) 6 Sheets—Sheet 1.

H. H. DILLE & E. W. McGUIRE.
LAWN MOWER.

No. 323,285. Patented July 28, 1885.

Fig. 1.

(No Model.) 6 Sheets—Sheet 2.
H. H. DILLE & E. W. McGUIRE.
LAWN MOWER.
No. 323,285. Patented July 28, 1885.
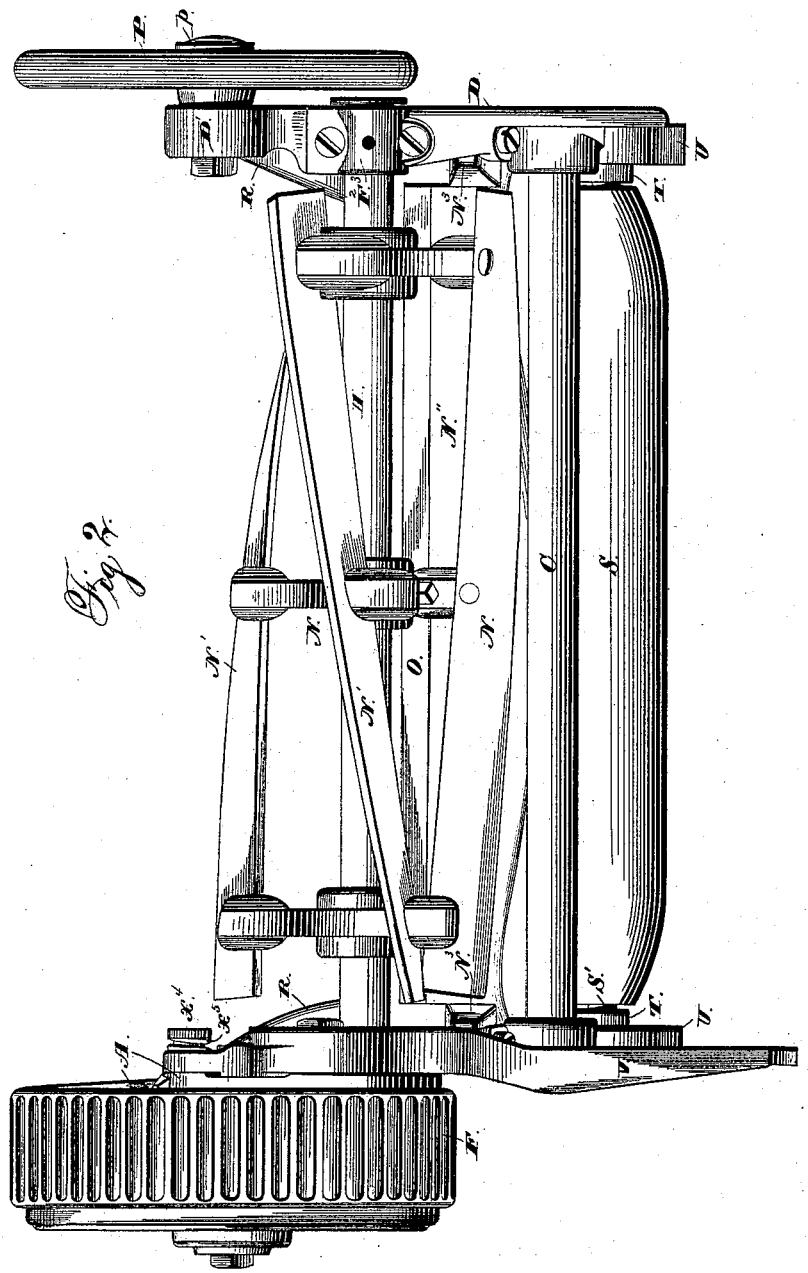

(No Model.) 6 Sheets—Sheet 3.
H. H. DILLE & E. W. McGUIRE.
LAWN MOWER.
No. 323,285. Patented July 28, 1885.
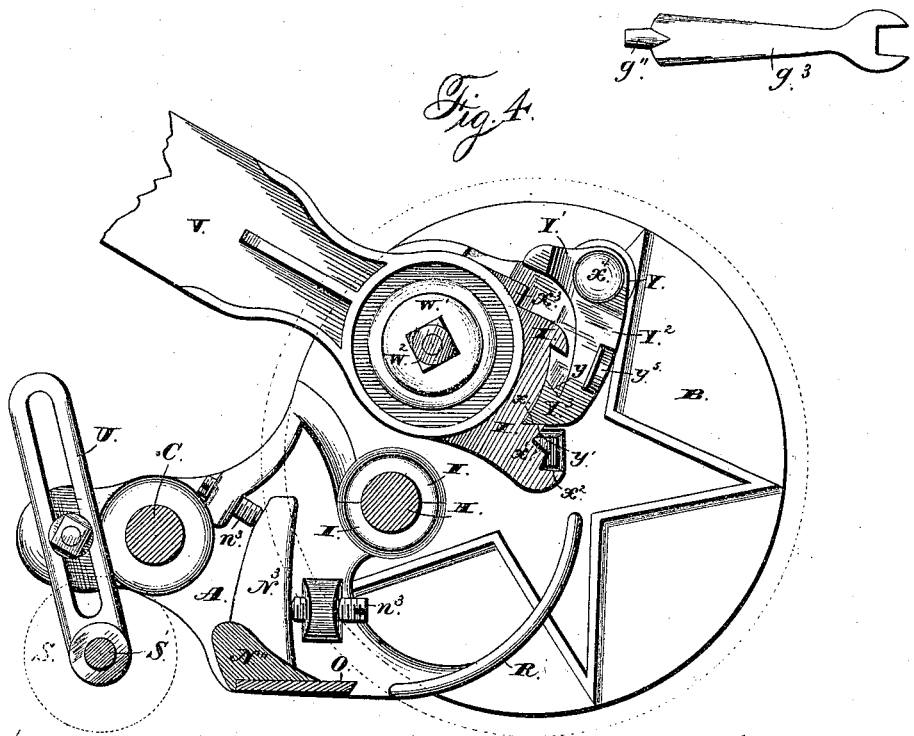
Witnesses:
Jas. E. Hutchinson
Henry C. Hazard
Inventor:
H. H. Dille and E. W. McGuire
by Prindle and Russell
attorneys.

(No Model.) 6 Sheets—Sheet 4.
H. H. DILLE & E. W. McGUIRE.
LAWN MOWER.
No. 323,285. Patented July 28, 1885.

(No Model.) 6 Sheets—Sheet 5.

H. H. DILLE & E. W. McGUIRE.
LAWN MOWER.

No. 323,285. Patented July 28, 1885.

Witnesses:
Jas. E. Hutchinson.
Henry C. Hazard.

Inventors:
H. H. Dille and E. W. McGuire
by Prindle and Russell
Attorneys (No Model.) 6 Sheets—Sheet 6.
H. H. DILLE & E. W. McGUIRE.
LAWN MOWER.

No. 323,285. Patented July 28, 1885.

Witnesses:
Jas. E. Hutchinson.
Henry C. Hazard.

Inventor.
H. H. Dille and E. W. McGuire
by Prindle and Russell
Attorneys

UNITED STATES PATENT OFFICE.

HENRY H. DILLE AND ELWOOD W. McGUIRE, OF RICHMOND, INDIANA.

LAWN-MOWER.

SPECIFICATION forming part of Letters Patent No. 323,285, dated July 28, 1885.

Application filed March 20, 1884. (No model.)

*To all whom it may concern:*

Be it known that we, HENRY H. DILLE and ELWOOD W. McGUIRE, of Richmond, in the county of Wayne, and in the State of Indiana, have invented certain new and useful Improvements in Lawn-Mowers; and we do hereby declare that the following is a full, clear, and exact description thereof, reference being had to the accompanying drawings, in which—

Figure 5:
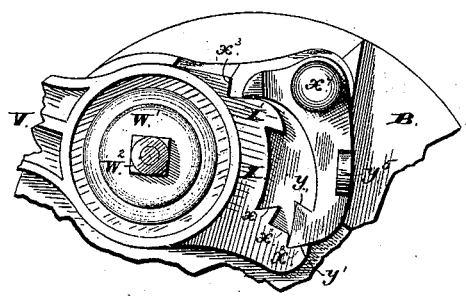
Figure 6:
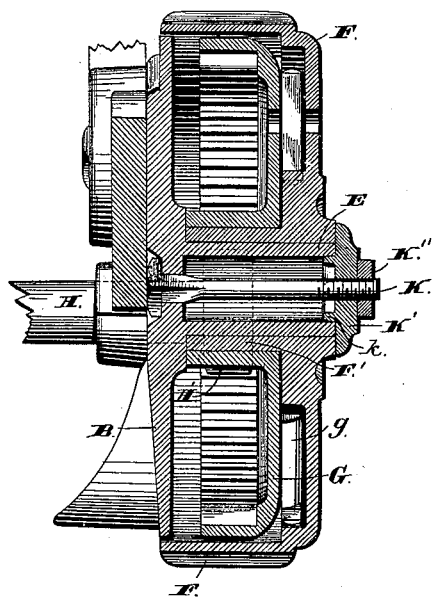
Figure 7:
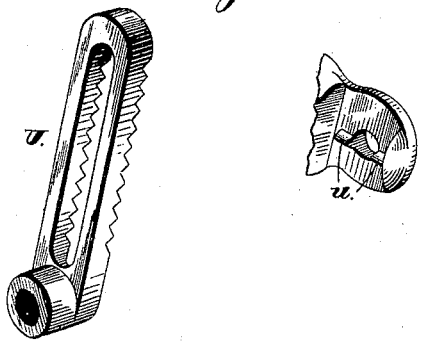
Figure 8:
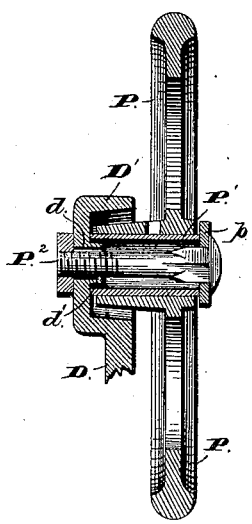
Figure 9:
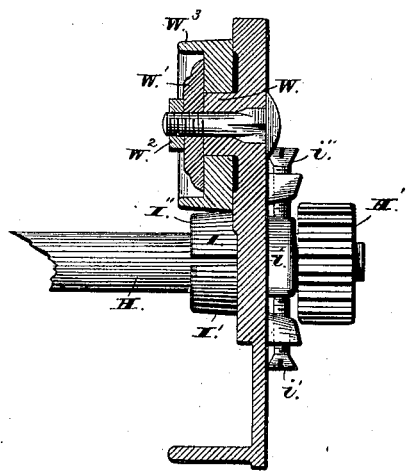
Figure 10:
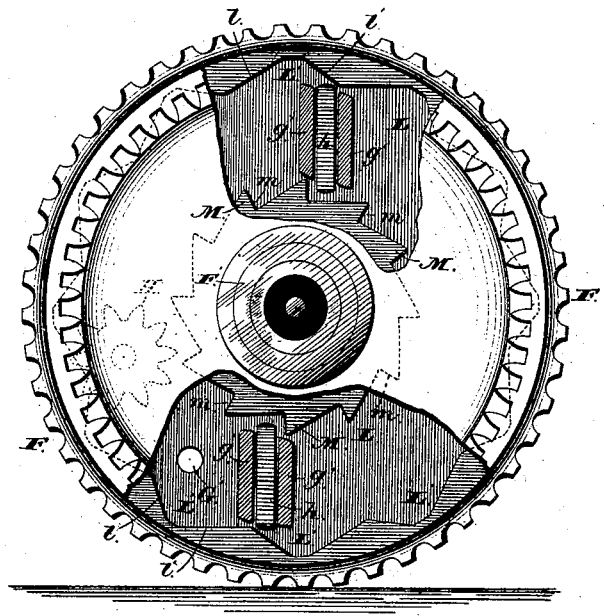
Figure 11:
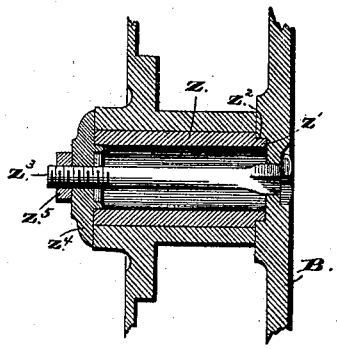

Figure 1 is a perspective view of our improved machine. Fig. 2 is a plan view of the same; Fig. 3, a view in side elevation of the drive-wheel, a portion broken away to show the ratchet-and-pawl mechanism; Fig. 4, a detail view in side elevation of the frame-plate closing the inner side of the drive-wheel, showing the situation and operation of the adjustable stop when the handle is adjusted with its rear end raised. Fig. 5, a similar view of the portion of the plate to which the handle is pivoted, showing the handle as adjusted with its rear end lowered. Fig. 6 shows a view of a vertical transverse section of the drive-wheel and frame-plate, looking toward the rear of the machine; Fig. 7, a detail view in perspective of the form of adjustment used for the bearings of the supporting-roller; Fig. 8, a vertical transverse section of the outer supporting-wheel, its journal, and the part of the frame to which it is attached; Fig. 9, a similar section through the gear-inclosing plate, the handle and the pivot thereof on the plate. Fig. 10 is a detail view showing the inner side of the drive-wheel, with a portion of the contained gear-wheel broken away; Fig. 11, a similar view, showing a modified form of axle for the drive-wheel.

The object of our invention is to provide an improved lawn-mower; and to this end it consists in the construction, arrangement, and combination of parts, as hereinafter described, and more specifically pointed out in the claims.

In the drawings, A designates a plate forming one side of the frame of our machine. The front portion, B, of this plate is disk-shaped, as shown. A cross-bar, C, serves to connect the plate A with the other side of the frame D, being rigidly attached at its ends to the sides. Cast on the outer side of disk B, at the center thereof, is the hollow cylindrical projection E, which is the axle upon which is journaled the drive-wheel F. This wheel, as shown, is dish-shaped, being open on its inner side. When the wheel is in place on its axle, the disk B fits within and closes the inner side of it, as shown. Said wheel is formed with a hub, F', which extends inward and fits upon and around the rigid axle E. Upon this hub is journaled the internally-geared wheel G, the teeth of which mesh with the pinion H' screwed on the end of the revolving cutter-shaft H. This shaft, where it passes through the disk-plate B, in the rear of the drive-wheel axle, is journaled in a bearing, I, like that described and shown by us in our Patent No. 231,286, dated August 17, 1880, consisting of the lower rigid half-bearing, I', and the upper movable half, I'', extending through the disk-plate.

On the inner side of the plate the movable half-bearing is provided on its forward side with an arm, $i$, extending downward. Against the lower end of this arm bears a screw, $i'$, working in a lug on the plate. Another screw, $i''$, also working in a lug on the plate, bears down against the upper side of the half-bearing at a point over the shaft opening in the bearing.

The drive-wheel F is held upon its hollow axle E by means of the bolt K, passing through the latter, and the disk or washer K' on the outer end of the bolt, held thereon and forced against the end of the axle by means of a nut, K''. This disk K' is provided on its inner face with radial ribs $k$ $k$, which fit into and engage the radial grooves or notches in the end of the axle, when the disk is forced home by the nut on the screw-threaded end of bolt K. The disk, which is thus prevented from turning, overlaps the central portion of the outer face of the drive-wheel around the axle, and holds said wheel in place on the latter, while allowing it to turn freely thereon.

Between the drive-wheel and the internal gear-wheel, journaled on its hub, there is a pawl-and-ratchet connection, which insures the turning together of the two wheels when the drive-wheel is rotating as in the forward motion of the machine, but allows the drive-wheel to turn backward freely and independently of the other.

The drive-wheel is provided on its inner face with an annular groove or way, L, the outer edge of which is provided with a series of recesses, L' L', having inclined sides $l\ l$ and $l'\ l'$. The inclines $l\ l$ are on the rear sides of the recesses with reference to the direction of rotation of the wheel as the machine is moved forward. The inclines $l'\ l'$ are on the other or front sides of the recesses, and are shorter and inclined at more of an angle than the inclines $l\ l$. The inclined sides of the recesses do not meet at the outer extremities or bottoms of said recesses; but the bottom of each recess is, for a short distance, formed with a face tangential to a circle described from the center of the wheel. The extent of this straight or slightly-curved surface $l''$ is a little greater than the width of one of the sliding pins or pawls, to be hereinafter described.

The inner wall of the way L around the hub F' of the wheel is formed with ratchet-teeth or projections M, the straight and radial faces $m\ m$ of which are on lines not radial but parallel to radial lines and striking the short inclines $l'\ l'$ at or about their middle points, as shown in Figs. 3 and 10.

On the outer face of the internal gear-wheel, G, situated diametrically opposite each other, are the ways $g\ g$, each formed by two parallel lugs, $g'\ g'$, having passages $g''\ g''$ between them. These passages are not in a line with each other, but extend in a direction parallel to but on opposite sides of a line through the center of the wheel. In these passages or ways slide the reciprocating pawls $h$, consisting of short bars, preferably square in cross-section and having the edges of their ends slightly rounded.

With the ways situated and extending in the direction as shown and described, the sides of the inner ends of the pawls, as they engage the square faces of the ratchet-teeth, are parallel to and strike squarely against them. (See Figs. 3 and 10.) As the drive-wheel turns backward the pawls will ride over the inclined faces of the teeth and recesses, reciprocating in and out. The pawls are of such length that they will as they are situated just pass between the opposite sides of the groove or way in the wheel. With this arrangement, construction, and operation, if the wheel be turned forward, as in the forward motion of the machine, the inclines on the outer side of the groove or way will throw the pawls both inward, so that their inner ends will engage the ratchet-teeth around the center of the wheel on the inner side of the way, as illustrated in the drawings.

In the outer side of the drive-wheel an opening, G', is provided. This is intended to allow the insertion of a pin or projection, $g'$, on a wrench when it is desired to turn the cutter-shaft backward in sharpening the cutter-blades.

The pin when inserted will, as the drive-wheel is rotated, strike against the lug forming the side of one of the pawlways, and the drive-wheel and internal gear can then be rotated together without reference to the action of the pawls.

Heretofore, when it has been desired to turn the cutter-shaft backward to clean and sharpen the knives, it has been necessary either to remove the drive-wheel, disconnect some of the gearing, or apply a turning device to some portion of the intermediate gearing between the drive-wheel and cutter-shaft. In no machine, as constructed heretofore, in which a backing ratchet or clutch has been used has it been possible to turn the cutter-shaft backward by a reversed movement of the drive-wheel itself without change in the gearing.

From its position in the wheel-side, the opening G', besides serving the purpose above described, also affords means of access to the pawls and ways for oiling the same.

As indicated hereinbefore, the frame of our machine is formed of the side plate, A, of the form described, and the outer side plate or frame, D, rigidly connected together by the cross-bar C. This frame is supported at its forward end on the one side by the drive-wheel, journaled on the rigid projection from the disk portion B of plate A, and on the other side by the wheel P, corresponding to the grain-wheel of a harvester, which is journaled upon an axle attached to the frame-plate D. This plate is, at its forward end, cast with a cup-shaped part, D', opening toward the outer side thereof. The inner side or bottom of this cup is provided with a central opening, $d$, around which is a short flange, $d'$. A bushing, P', or short hollow axle is held in place, with its inner end pressed against the bottom of the cup D', and surrounding the flange $d'$ by a bolt, P², passing through the bushing or axle and the opening in plate D, and provided with a washer or disk, $p$, bearing against the outer end of the hollow axle and overlapping it, as shown. Upon this axle, between this washer and the bottom of the cup D', is journaled the wheel P. The sides of the cup extend over the hub of the wheel, so as to prevent grass or dirt getting in between the inner end of the hub and the bottom face of the cup.

As the frame is thus supported at its forward end, it is free to rise and fall with any unevenness in the ground, swinging from the axles of the wheels as centers. Our machine is then what is known as a "rear-cut" machine—that is, the cutting apparatus, supported and journaled in the frame, is in the rear of the axle of the driving and supporting wheels. The advantages of such a construction, especially where a handle pivoted to have some up-and-down play is used, are well known and need not be set forth here.

The outer end of the cutter-shaft is journaled in the bearing F² on the upper edge or top of the side plate, D. The upper portion of the journal-bearing is made removable and adjustable to take up wear by means of screws, as shown. The extreme end of the shaft beyond this bearing is formed with flange $h$, preventing inward movement of the shaft through its bearings.

Upon the cutter-shaft is the spiral cutter N, the blades N' of which cut against the stationary straight-edged cutter-blade O, screwed or otherwise fastened to the bottom face of the bar N'', extending across from side to side of the machine. This bar is to the rear of as well as below the cutter-shaft, as shown.

The cutter-blade O extends forward beyond the edge of the bar, so as to be just in the rear of a vertical plane through the spiral cutter-shaft.

The bar N'' is at each end pivoted to the sides of the frame by pivot-studs $n'$ entering the pivot-holes $n$ in the frame-plates.

From the stationary cutter-bar extend upward, at substantially right angles to the plane of the cutter-blade, rigid arms $N^3$ $N^3$, each of which is engaged on opposite sides by the ends of the adjusting-screws $n^3$ $n^3$, tapped through lugs cast on the frame-plates. By means of these screws the bar can be rocked and adjusted on its pivot-studs, so as to bring the edge of the cutter nearer to or farther from the revolving cutters.

As shown, the sides of the frame are cast with curved guard-flanges R R to prevent the grass from getting in between the ends of the revolving or fixed cutters and the frame-plates. These flanges, as shaped, with their inwardly-inclined edges, will guide any blades of grass coming in contact with them inward, so that they will come in the path of the cutters.

The rear end of the frame is supported upon a roller, S, extending from side to side between the rear ends of the frame-sides just behind the stationary cutter-bar N''.

The ends S' S' of the roller-shaft are journaled in bearings T T in the lower ends of slotted bars U U. These bars are on their outer faces serrated, as shown. The inner sides of the rear ends of the frame are provided with grooves U' U', in which these bars fit, the bottoms or inner faces of which grooves are formed with the teeth or projections $u$ $u$, adapted to engage opposite notches on the bars U U. Bolts pass through the slots in the bars and through openings in the ends of the frame between the teeth on the inner faces of the groove, and serve to clamp the serrated outer sides of the bars firmly against the inner faces or bottoms of the grooves U' U'. By these means the roller-bearings can be adjusted up or down and fixed, as desired, according as the cut is to be made close or not.

The plate or arm V, to which the handle is attached, is pivoted to the inner face of disk B above and to the rear of the center of such disk, or the point at which is situated the driving-wheel axle upon which the frame is supported. The rear end of this attaching-plate is provided with means—as the two bolts $v$ $v$, one passing through a slot curved from the other as a center—for attaching a metal or wooden handle to it. This plate is pivoted upon a hollow projection or stud, W, cast on the disk B of frame-plate A. It is kept in place on this stud by means of a bolt passing through the disk and stud, and carrying a washer, W', and a nut, $W^2$, by which the washer is forced and held against the end of the stud. This washer is larger than the end of the stud, and extends on all sides beyond it, overlapping a portion of the handle-plate. Said plate can then by this means be held in place on its pivot-stud, while being left free to turn or rock thereon. An annular flange, $W^3$, on the inner face of the plate surrounds this washer and extends inward over it, thus protecting the pivotal bearing of the plate from dust and dirt, which otherwise would be apt to get in between the washer and plate.

The end of the handle-plate in front of the pivotal point thereof has, below, the forwardly-projecting portion X, which on its upper side is notched to form the series of three steps, $x$ $x'$ $x^2$, extending from the front end of the projection rearward and upward. The end of the plate is formed with an upper projection, X', shorter than that already described. Above and to the rear of this projection is a stop or shoulder, $x^3$. The lower face of said projection is inclined upward from its forward edge toward the rear, and the upper face of the step $x^2$ is inclined in the opposite direction, as shown in the drawings.

In front of the handle-attaching arm or plate V, and above the plane of its pivot, is pivoted the stop-pawl Y, which has a short arm, Y', which, when the handle is adjusted, as shown in Fig. 6, extends over the projection X' toward the shoulder $x^3$. It is not in contact with the upper face of the projection, nor does its end reach said shoulder until the handle is thrown up on its pivot a certain distance. The shoulder, which by the movement of the handle-plate is turned forward, will then come in contact with the end of the pawl-arm, and the upward movement of the handle will thereby be stopped. The other arm, $Y^2$, of the pawl extends downward at right angles to the other arm in front of the handle-plate end. At its lower extremity the arm $Y^2$ is bent toward the handle-plate V. This backwardly-turned portion $Y^3$ is enlarged toward its rear end, its upper and lower faces, $y$ and $y'$, being inclined upward and downward, respectively. With the adjustment of the handle (shown in Fig. 6) the lower face, $y'$, of the pawl end $Y^3$ strikes against the face of stop $x$. The downward movement of the handle, and consequent upward movement of the lower projection on the handle-plate, is therefore limited by the pawl end. With this construction the handle and handle-plate can have play on its pivot between the points at which the lower step, $x$, and the shoulder $x^3$ come in contact, respectively, with the lower and upper ends of the pawl. Said pawl is pivoted on a rivet, $x^4$, fixed in the disk.

Between the head of the rivet and the side of the pawl is a spiral spring, $x^5$, surrounding the rivet, serving to force the pawl against the bearing-surface on the disk-plate B, and thereby acting to hold the pawl frictionally in any position in which it may be placed.

The arm $Y^2$ of the pawl is provided with a thumb-piece, $y^5$, by which it can be moved to rock the pawl on its pivot.

When it is desired to adjust the handle higher, as is often desirable, it is raised until the shoulder $x^3$ on the handle-plate comes into or nearly into contact with the arm $Y'$. The lower end of the arm $Y^2$ will then be above the face of second step, $x'$, on the lower projection, X, on the plate. The arm $Y^2$ is then pushed inward, so that its end $Y^3$ passes rearward over the step. By such movement the arm $Y'$ is carried above and out of engagement with shoulder $x^3$. The handle can then be lifted higher, the forward end of the plate being consequently turned downward until the step $x^2$ comes below the end $Y^3$ of the pawl-arm. This arm is then pushed inward toward the plate until its end $Y^3$ is situated above the step and between it and the lower inclined face of the upper projection, $X'$. The handle-plate can then rock up and down on its pivot until the pawl end is struck either above or below by the upper projection, $X'$, or by the tread of the step $x^2$. With this construction of adjusting-stop for the handle, said handle can be adjusted high or low, and at each adjustment will be free to have play on its pivot as the machine passes over the ground. Such play of the handle on its pivot is necessary when the frame is hung at its front end, and trails over the ground, being supported at its rear end on a roller or upon wheels.

Where the handle is, as ours, pivoted to such a frame above the plane of the supporting-axle of the drive-wheel, and so as to allow of play on its pivot, the rear end of the frame will obviously be eased in its passage over the ground by the push upon the handle as the machine is driven forward.

We have found that with the handle pivoted, as ours is, to the inner side of the disk, closing the side of the drive-wheel, there is little or no side draft, and the tendency of the machine is to go straight ahead, even without guiding by the handle.

In Fig. 11 is shown a modified form of axle for the drive-wheel. This consists of the hollow cylinder Z, formed at its inner end with reduced portion $Z'$, adapted to fit in the recess $Z^2$ in the frame-plate. It is held in place therein, so that the cylinder makes a rigid axle for the wheel by the bolt $Z^3$, carrying the washer $Z^4$, forced against the cylinder end by the nut $Z^5$ on the threaded end of the bolt.

Having thus fully set forth the nature and merits of our invention, we claim and desire to secure by Letters Patent—

1. In combination with the side plate of the frame provided with a hollow stud, the handle-attaching plate pivoted thereon and held in place by means of a bolt passing through the stud, a nut on the bolt, and a washer between the nut and plate, substantially as shown and described.

2. In combination with a handle-attaching plate formed with an annular flange on its inner side, and pivoted on a hollow pivot-stud on the side plate of the frame, a bolt passing through the frame-plate and stud, a nut on the bolt, and a washer held against the end of the stud by the nut and bearing against the side of the handle-plate within the annular flange, substantially as and for the purpose described.

3. In combination with the frame-plate formed on its outer side with a hollow cylindrical stud provided on its outer end with radial grooves or notches, the drive-wheel journaled on the stud, a bolt passing through the latter, a washer on the bolt of greater diameter than such stud, and provided with radial ribs adapted to fit the grooves or notches in the stud end, and a nut on the bolt adapted to force and hold the washer against such end, substantially as and for the purpose described.

4. In combination with the hollow drive-wheel open on its inner side, the disk-shaped portion of the frame-plate fitting within and closing the open side of the wheel, the hollow stud cast on the plate and forming the axle upon which the wheel is journaled, the bolt passing through the stud, the washer on the bolt of a larger diameter than the stud, and provided with radial ribs adapted to fit in notches in the stud end, and the nut on the bolt adapted to force and hold the washer against the stud, substantially as shown and described.

5. In combination with the driving-wheel formed with an annular concentric groove or recess in one side, having one of its walls formed with a series of recesses having inclined sides and the other with ratchet-teeth, the wheel to be driven from the driving-wheel provided with ways in which slide reciprocating pawls adapted to engage the opposing ratchet-teeth and inclined sides of the recesses at the sides of the annular groove as the driving-wheel rotates, substantially as and for the purpose described.

6. The wheel formed with a series of ratchet-teeth, each having its squared face not radial but parallel to a radius, and with an opposing concentric series of alternately long and short inclines, the latter opposite the points of the ratchet-teeth, in combination with the wheel carrying on its side sliding pawls guided in ways not radial but parallel to the same diameter and so situated on the wheel that the pawls are brought between the series of teeth and recesses when the wheels are placed together concentrically, substantially as shown and described.

7. In combination with the driven wheel carrying pawls sliding in ways on its side, the driving-wheel provided with ratchet-teeth adapted to be engaged by the inner ends of the pawls, and with a concentric series of recesses with inclined sides adapted to engage the outer ends of the pawls and so situated with reference to the ratchet-teeth that as the wheels revolve independently the pawls will be caused to slide inward so as to be in position to engage the ratchet-teeth, substantially as shown and described.

8. The drive-wheel provided with an annular groove on its inner face having one side formed with ratchet-teeth and the other side formed with alternately long and short inclined portions, inclined, respectively, outwardly and inwardly, in combination with the power-transmitting wheel provided with pawls guided in ways thereon and reciprocating between the ratchet-teeth and inclines as the drive-wheel is rotated backward, but adapted to engage the ratchet-teeth when the drive-wheel is rotated in the opposite direction.

9. In combination with the pivoted handle-attaching plate, the pawl pivoted on the frame-plate and engaging notches or steps on the forward end of the handle-plate, substantially as shown and described.

10. In combination with the handle-attaching plate pivoted to the frame and provided on its front end with notches or steps, the pivoted pawl adapted to engage such notches or steps to adjust the angle of the handle-plate and to allow play of the same upon its pivot at any point of its adjustment, substantially as shown and described.

11. In combination with the notched or stepped end of the handle-attaching plate, the two-armed pawl pivoted to the frame-plate and provided with a friction-spring to hold it from accidental movement, substantially as shown and described.

12. The pivoted handle-attaching plate having on its forward end a projection, X, provided with steps $x\, x'\, x^2$, and a projection above provided on its upper side with shoulder $X^3$, in combination with the two-armed pivoted pawl Y, adapted to engage the steps, shoulder, and projections on the handle-plate, substantially as shown and described.

13. In combination with the two-armed pawl, the handle-attaching plate provided with the step engaged by the lower end of the pawl, the shoulder engaged by the end of the other pawl-arm, the intermediate step to allow the lower end of the pawl-arm to be carried inward to disengage the other arm and shoulder to permit the handle to be raised, the upper and inner step, and the upper projection between which the lower end of the pawl-arm projects when the handle is adjusted on its pivot to its highest point, substantially as and for the purpose described.

14. The frame-plate cast with a concave portion open on its outer side, the supporting-wheel having a hub extending within the sides of the concavity, the hollow bushing or short axle for the wheel with its inner end resting against the bottom of the concavity, and means for clamping and holding such bushing in place to form a rigid axle, substantially as shown and described.

15. In a lawn-mower, in combination with the supporting-wheel having an inwardly-extending hub, the side frame-plate provided with an axle for the wheel and with a flange extending out, over, and around the hub, substantially as and for the purpose set forth.

16. In a lawn-mower, the side frame cast with a cup-shaped portion open on its outer side, having a central opening through its inner side surrounded by an annular flange, a hollow cylinder clamped and held against the bottom of the cup by means of a bolt passing through the frame and cylinder, and carrying on its outer end a washer overlapping the end of the cylinder, and a wheel journaled on the cylinder as an axle, all combined substantially as and for the purpose set forth.

17. In a lawn-mower, the drive-wheel and the independent gear-wheel adapted to be locked together so that the gear-wheel can be turned backward by the rotation of the drive-wheel, substantially as and for the purpose described.

18. In a lawn-mower, a drive-wheel and a concentric gear-wheel for driving the cutter, connected together by means of a backing ratchet or clutch and adapted to be locked together so that the gear-wheel can be turned backward by rotation of the drive-wheel, substantially as and for the purpose described.

19. In a lawn-mower having a drive-wheel and a concentric gear-wheel for driving the cutting apparatus connected with the drive-wheel by a backing ratchet or clutch, the drive-wheel provided with an opening to admit the insertion of a pin to lock the drive and gear wheels together, substantially as and for the purpose described.

20. In a lawn-mower, the gear-wheel meshing with the pinion on the cutter-shaft, in combination with the drive-wheel inclosing said gear, and connected therewith by a backing ratchet or clutch mechanism and provided with an opening for the admission of a pin or other device for locking together the drive and gear wheel, substantially as shown and described.

21. In a lawn-mower having a hollow drive-wheel and a gear-wheel journaled on the hub of the drive-wheel and connected with said wheel by sliding pawls engaging ratchet-teeth on the drive-wheel, the drive-wheel provided with an opening through which a pin or equivalent device can be inserted to engage the side of one of the pawlways, substantially as shown and described.

In testimony that we claim the foregoing we have hereunto set our hands this 11th day of March, A. D. 1884.

HENRY H. DILLE.
ELWOOD W. McGUIRE.

Witnesses:
HENRY I. McGUIRE,
JAMES J. RUSSELL.